Patented Nov. 7, 1950

2,528,634

UNITED STATES PATENT OFFICE 2,528,634

OPHTHALMIC GLASS

William H. Armistead, Corning, N. Y., assignor to Corning Glass Works, Corning, N. Y., a corporation of New York No Drawing. Application September 16, 1949, Serial No. 116,221

6 Claims. (Cl. 106—53)

This invention relates to ophthalmic glasses and particularly to flint glasses which in the form of small inserts form the well-known bifocal lenses when joined with a suitable crown glass.

In general, crown glasses are alkali-lime-silicate glasses. In order to standardize the production of crown glass for use in bifocal lenses and to facilitate the manufacture and use of flint glasses in combination therewith, the industry has adopted a crown glass having a definite thermal expansion coefficient, namely, $94 \times 10^{-7}$ cm. per cm. per °C. between 0° and 300° C., known as "spectacle crown."

Flint glasses so used are, generally speaking, alkali-lead-silicate glasses having an index of refraction for the D line $(n_D)$ between 1.61 and 1.71. In order that the junction of the flint with the crown may be free from undesirable stress, the thermal expansion coefficient of the flint, measured in the conventional temperature range of 0° to 300° C., must be somewhat less than that of the crown measured in the same range. The thermal expansion coefficient of the flint glass preferably is between $84 \times 10^{-7}$ and $91 \times 10^{-7}$ cm. per cm. per °C. between 0° and 300° C.

Heretofore in the manufacture of bifocal lenses by sealing prior flint glasses with spectacle crown, the percentage of satisfactory lenses selected after sealing has been undesirably low because in an objectionably large percentage of such lenses numerous minute gas bubbles form during sealing at the interface between the crown and the flint. Such bubbles are not entrapped air but apparently are evolved from the flint glass when it is so heated. Inasmuch as the seals are made only after the surfaces to be sealed have been ground and polished to a prescribed curvature at considerable expense, it is obvious that any increase in the percentage of satisfactory lenses by reduction or elimination of this interfacial bubbling is greatly to be desired.

It has now been found that this difficulty can be largely overcome and the percentage of satisfactory finished bifocal lenses can be substantially increased by introducing into the flint glass certain critical proportions of $ZrO_2$ and $Al_2O_3$. Glasses have thus been produced which have resulted in considerable saving in the expense of manufacturing bifocal lenses and which are well on the way to displacing prior flint glasses for this purpose.

The new glasses comprise essentially 32% to 48% $SiO_2$, 6.5% to 11% of one or more alkali metal oxides selected in the indicated proportions from the group consisting of up to 11% $K_2O$, up to 11% $Na_2O$, and up to 2% $Li_2O$, 36% to 54% $PbO$, 0.5% to 4% $Al_2O_3$, and 0.5% to 7% $ZrO_2$, the total $Al_2O_3$ and $ZrO_2$ being 2.5% to 10%, and the total of essential constituents being at least 92%. Either $K_2O$ or $Na_2O$ or both must be present; preferably, however, $Li_2O$ should be absent.

Glasses, which are particularly suitable for combination with spectacle crown, comprise essentially 32% to 48% $SiO_2$, 4% to 8% $K_2O$, 0.5% to 6% $Na_2O$, the total $K_2O$ and $Na_2O$ being 6.5% to 11%, 38% to 51% $PbO$, about 2% $Al_2O_3$ and about 3% $ZrO_2$, the total of the essential constituents being at least 92%.

Only the indicated critical and relatively narrow ranges of proportions produce glasses which yield the desired result. While other metallic oxides commonly used in making glass may be present if desired, the total amount of such non-essential oxides should not exceed 8% at the most nor comprise more than 6% of one or more oxides of the metals of the second periodic group, nor more than 6% $TiO_2$, nor more than 5% $B_2O_3$. Since $B_2O_3$ for reasons unknown increases the grinding time of the glass, this oxide should preferably be omitted or used sparingly. Generally, not more than about 2% of either arsenic oxide or antimony oxide, either or both of which may serve as fining agents, need be employed.

Variations in the proportions of the essential constituents of the present glasses, namely, $SiO_2$, alkali metal oxide, $PbO$, $Al_2O_3$ and $ZrO_2$, should be confined within the limits set forth above for the following reasons:

Bubbling at the interface during sealing may occur if there is a deficiency of one or more of the constituents $Al_2O_3$, $ZrO_2$ and $SiO_2$ or an excess of $PbO$ or alkali metal oxide. An excess of $Al_2O_3$ or $ZrO_2$ on the other hand raises the softening point of the glass objectionably. The expansion coefficient of the glass becomes too low with a deficiency of alkali metal oxide and too high with an excess thereof. Low refractive index results from too little $PbO$ or too much $SiO_2$.

For illustrating but not limiting the invention, the following compositions (exclusive of arsenic oxide when used as the fining agent) are given in percent by weight as calculated from their batches on the oxide basis:

|  | 1 | 2 | 3 | 4 | 5 | 6 | 7 | 8 | 9 | 10 | 11 |
|---|---|---|---|---|---|---|---|---|---|---|---|
| $SiO_2$ | 45 | 34.4 | 36.2 | 38.5 | 35.6 | 36.5 | 33.5 | 41.9 | 34.8 | 34 | 45 |
| $K_2O$ | 4.5 | 7.6 | 7.4 | 7.4 | 5.5 | 4 | 6.5 | 4.5 | 4.5 | 7.8 |  |
| $Na_2O$ | 5.5 | 0.5 | 0.7 | 1.6 | 1.4 | 4 | 1.5 | 5.6 | 3.5 |  | 9 |
| $Li_2O$ |  |  |  |  |  |  |  |  | 0.5 |  |  |
| $PbO$ | 40 | 48.7 | 48.9 | 47.5 | 50.7 | 45 | 52 | 41 | 45 | 51.4 | 41 |
| $Al_2O_3$ | 2 | 2 | 2 | 2 | 2 | 2 | 0.5 | 4 | 2 | 2 | 2 |
| $ZrO_2$ | 3 | 3 | 3 | 3 | 1 | 5 | 6 | 3 | 5 | 1 | 3 |
| $TiO_2$ |  |  | 3.8 | 1.8 |  | 3.8 |  |  | 3.7 | 3.8 |  |
| $Sb_2O_3$ |  |  |  |  |  | 2.5 |  |  | 1 |  |  |
| $n_D$ | 1.616 | 1.700 | 1.680 | 1.653 | 1.700 | 1.687 | 1.702 | 1.622 | 1.703 | 1.700 | 1.621 |
| Expansion Coefficient×$10^7$ | 89 | 88 | 89 | 90 | 89 | 88 | 89 | 89 | 87 | 90 | 88 |

With the exceptions of compositions 6 and 9 a small amount of $As_2O_3$ not exceeding 1% was employed in the above compositions as fining agents. In compositions 6 and 9 the presence of $Sb_2O_3$, which also acts as a fining agent, made this unnecessary.

Glasses having the above compositions, when ground and polished and sealed with spectacle crown in the manner commonly employed in the manufacture of bifocal lenses, have materially less tendency to form interfacial bubbles and result in a substantially higher percentage of good lenses with a consequent considerable saving in cost than prior flint glasses used for this purpose.

Compositions 1—4 which contain the essential ingredients within the preferred ranges, are particularly suitable for the present purpose because their softening points are substantially alike, namely, between 633° C. and 635° C., but their refractive indices cover the range 1.616 to 1.700 which is useful for bifocal lenses. By using compositions 1—4, bifocal lenses of widely varying prescriptions can be heated and sealed simultaneously in a single kiln with a consequent saving of time and expense. Composition 1 is particularly desirable for general use.

I claim:

1. A glass comprising essentially 32% to 48% $SiO_2$, at least one alkali metal oxide in the indicated proportion selected from the group consisting of up to 11% $K_2O$, up to 11% $Na_2O$, and up to 2% $Li_2O$, the selected alkali metal oxide including an oxide selected from the group consisting of $K_2O$ and $Na_2O$ in the above-indicated proportion, the total alkali metal oxide being between 6.5% and 11%, 36% to 54% PbO, 0.5% to 4% $Al_2O_3$, and 0.5% to 7% $ZrO_2$, the total $Al_2O_3$ and $ZrO_2$ being 2.5% to 10% the total of the essential constituents being at least 92%, the index of refraction ($n_D$) being 1.61 to 1.71, and the thermal expansion coefficient being between $84 \times 10^{-7}$ and $91 \times 10^{-7}$ cm. per cm. per °C. between 0° and 300° C.

2. A glass comprising essentially 32% to 48% $SiO_2$, 4% to 8% $K_2O$, 0.5% to 6% $Na_2O$, the total $K_2O$ and $Na_2O$ being 6.5% to 11%, 38% to 51% PbO, about 2% $Al_2O_3$, and about 3% $ZrO_2$, the total of the essential constituents being at least 92%, the index of refraction ($n_D$) being 1.61 to 1.71, and the thermal expansion coefficient being between $84 \times 10^{-7}$ and $91 \times 10^{-7}$ cm. per cm. per °C. between 0° and 300° C.

3. A glass consisting essentially of 32% to 48% $SiO_2$, 4% to 8% $K_2O$, 0.5% to 6% $Na_2O$, the total $K_2O$ and $Na_2O$ being 6.5% to 11%, 38% to 51% PbO, about 2% $Al_2O_3$ and about 3% $ZrO_2$, the index of refraction ($n_D$) being 1.61 to 1.71, and the thermal expansion coefficient being between $84 \times 10^{-7}$ and $91 \times 10^{-7}$ cm. per cm. per °C. between 0° and 300° C.

4. A glass comprising essentially 32% to 48% $SiO_2$, 4% to 8% $K_2O$, 0.5% to 6% $Na_2O$, the total $K_2O$ and $Na_2O$ being 6.5% to 11%, 38% to 51% PbO, about 2% $Al_2O_3$, and about 3% $ZrO_2$, the total of such essential constituents being at least 92%, and containing up to 6% $TiO_2$, the index of refraction ($n_D$) being 1.61 to 1.71, and the thermal expansion coefficient being between $84 \times 10^{-7}$ and $91 \times 10^{-7}$ cm. per cm. per °C. between 0° and 300° C.

5. A glass consisting approximately of 45% $SiO_2$, 4.5% $K_2O$, 5.5% $Na_2O$, 40% PbO, 2% $Al_2O_3$, and 3% $ZrO_2$.

6. A glass according to claim 1 which contains up to 6% $TiO_2$.

WILLIAM H. ARMISTEAD.

No references cited.